US012671577B2

(12) United States Patent
Macchetti et al.

(10) Patent No.: US 12,671,577 B2
(45) Date of Patent: Jun. 30, 2026

(54) METHOD FOR PAIRING A CONTENT PROVIDER SYSTEM AND A RECEIVING DEVICE, CORRESPONDING COMPUTER PROGRAM PRODUCT AND DEVICES

(71) Applicant: NAGRAVISION SARL,
Cheseaux-sur-Lausanne (CH)

(72) Inventors: Marco Macchetti,
Cheseaux-sur-Lausanne (CH); Didier Hunacek, Cheseaux-sur-Lausanne (CH);
Karine Villegas,
Cheseaux-sur-Lausanne (CH)

(73) Assignee: NAGRAVISION SÀRL,
Cheseaux-sur-Lausanne (CH)

( * ) Notice: Subject to any disclaimer, the term of this patent is extended or adjusted under 35 U.S.C. 154(b) by 113 days.

(21) Appl. No.: 18/651,810

(22) Filed: May 1, 2024

(65) Prior Publication Data
US 2024/0372716 A1 Nov. 7, 2024

(30) Foreign Application Priority Data
May 2, 2023 (EP) ..................................... 23171050

(51) Int. Cl.
*H04L 9/08* (2006.01)
*H04L 9/30* (2006.01)

(52) U.S. Cl.
CPC .......... *H04L 9/0866* (2013.01); *H04L 9/0869* (2013.01); *H04L 9/3066* (2013.01)

(58) Field of Classification Search
CPC ... H04L 9/0866; H04L 9/0869; H04L 9/3066; H04L 9/3073; H04L 63/0442; H04W 12/041; H04W 12/50
See application file for complete search history.

(56) References Cited

U.S. PATENT DOCUMENTS

| | | | |
|---|---|---|---|
| 8,108,678 B1 | 1/2012 | Boyen | |
| 9,641,333 B2 * | 5/2017 | Scott | ..................... H04L 9/0822 |

(Continued)

FOREIGN PATENT DOCUMENTS

| | | | | |
|---|---|---|---|---|
| CN | 104753917 A | * | 7/2015 | ........... H04L 9/0847 |
| CN | 108347417 A | * | 7/2018 | ......... H04L 63/0876 |

(Continued)

OTHER PUBLICATIONS

European Search Report issued Sep. 29, 2023 in European Application 23171050.0 filed on May 2, 2023, 8 pages.

(Continued)

*Primary Examiner* — John B King
(74) *Attorney, Agent, or Firm* — Maier & Maier, PLLC

(57) ABSTRACT

A method for pairing a content provider system and a receiving device, a cryptographic function and a receiving device unique identifier being populated in the receiving device. According to such method, the receiving device executes: obtaining a first key which is a result of a first function taking as arguments an Identity Based Encryption scheme master key owned by an authority server and an output of the cryptographic function applied to the receiving device unique identifier; receiving, from the content provider system, a content provider unique identifier; and computing a secret key which is a result of a second function taking as operands the first key and an output of the cryptographic function applied to the content provider unique identifier, the secret key being known from the content provider system.

19 Claims, 3 Drawing Sheets

(56)                    References Cited

U.S. PATENT DOCUMENTS

| 2004/0098589 | A1 | 5/2004 | Appenzeller et al. | |
| 2005/0084100 | A1 | 4/2005 | Spies et al. | |
| 2008/0148047 | A1 | 6/2008 | Appenzeller et al. | |
| 2009/0034742 | A1 | 2/2009 | Appenzeller et al. | |
| 2013/0198524 | A1 | 8/2013 | Balinsky et al. | |
| 2019/0058701 | A1 * | 2/2019 | Wu ....................... | H04L 9/3242 |
| 2022/0030435 | A1 * | 1/2022 | Rule ................... | H04W 12/068 |

FOREIGN PATENT DOCUMENTS

| EP | 1 673 890 | B1 | 8/2013 | | |
| WO | WO-2012036979 | A1 * | 3/2012 | ............... | H04L 9/14 |
| WO | WO-2018147800 | A1 * | 8/2018 | ........... | H04L 9/0869 |
| WO | WO-2019137067 | A1 * | 7/2019 | ........... | H04L 63/062 |

OTHER PUBLICATIONS

Kate et al., "Pairing-Based Onion Routing with Improved Forward Secrecy", IACR, 2008, 26 pages.

\* cited by examiner

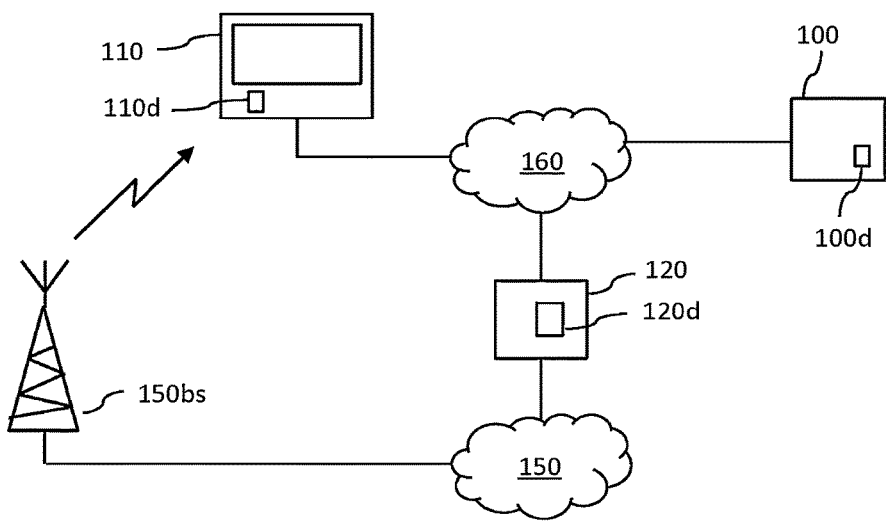
Figure 1
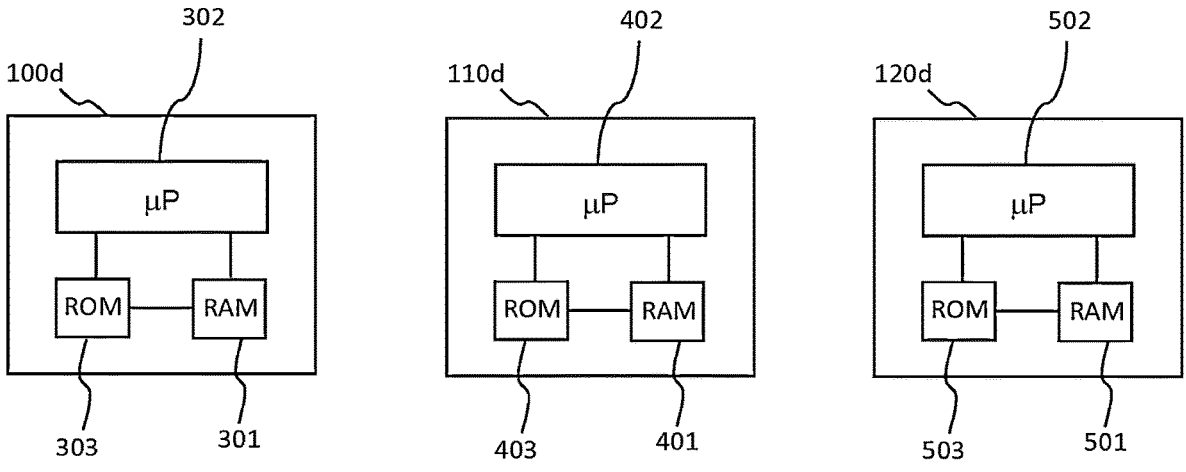
Figure 3          Figure 4          Figure 5

METHOD FOR PAIRING A CONTENT PROVIDER SYSTEM AND A RECEIVING DEVICE, CORRESPONDING COMPUTER PROGRAM PRODUCT AND DEVICES

1. FIELD OF THE DISCLOSURE

The field of the disclosure is that of the securing of the delivering of content to a receiving device.

More specifically, the disclosure relates to a method for pairing a content provider system and a receiving device intended to receive content data from the content provider system in order to secure the delivery of the content.

The disclosure can be of interest in any field wherein such securing of the delivery of content occurs. This is the case for instance in the field of pay-TV or, more generally, in the field of the delivery of conditional access data.

2. TECHNOLOGICAL BACKGROUND

Operators are currently in charge of distributing conditional access content or protected content made available to users by means of receiving devices able to handle multimedia contents. Each user can have several receiving devices such as smartphones, tablets, laptops or TV receiving devices for example. The explosion in the number of receiving devices poses a certain number of problems to the operators.

Currently, in a transmission environment of the "broadcast" type, each receiving device is dedicated to a given operator. This is known as vertical market. A receiving device is specifically personalized for this operator or paired with this operator and contains cryptographic means (algorithms, keys) specific to this operator.

The pairing between a multimedia unit and a specific operator takes place in the following way. When a supplier of Conditional Access Systems (CAS) wishes to have receiving devices produced and secured, in the first place they make the electronic modules (chipsets) be produced. These electronic modules are personalized by the manufacturer by means of secret data which is provided by the CAS supplier.

The CAS supplier makes electronic modules be produced which could be associated to an operator among a plurality of operators, and as the operator to which a specific electronic module will be finally associated is not known at the moment of the personalization of the electronic module, the CAS supplier personalizes the modules with data which are specific to them and totally independent of the operators.

The pairing of the receiving device with the operator can be made in two different ways: either at the production of the multimedia unit, or during its initialization by the final user.

In the first case, once the electronic modules are personalized, they are transmitted to the manufacturer of the receiving devices for being integrated into their units. At this stage, each receiving device will be associated to a specific operator so that it will be able to treat only information coming from this operator. For this purpose, the manufacturer of receiving devices has to personalize each receiving device according to the intended operator. In other words, the receiving device and the operator have to be paired.

In order to do this, the supplier of the CAS has to deliver data specific to the operator, in particular unique and global keys of this operator, for all the receiving devices intended to the concerned operator, in order to allow the operator to subsequently send data and content to these receiving devices in a secure way. This implies delivering, to the manufacturer of the receiving devices, all the "operator data" encrypted for each of the electronic modules, which represents huge quantities of data. Alternatively, it is possible to supply an autonomous unit such as a security hardware module known under the name Hardware Security Module (HSM), which can produce the data on the fly. This option has the drawback of exposing the algorithms and the keys of the CAS supplier if the security of the hardware security module is compromised.

In order to reduce the quantity of data to be transmitted during the personalization of the receiving devices, it would be advantageous to be able to produce these receiving devices without secret data of an operator and allow an operator to personalize the receiving devices remotely by using for example the transmission channel which is generally available to them.

In the second case, i.e. if the receiving device is paired with the operator during initialization of the receiving devices at the final user premises, the operator is the one carrying out the personalization of the multimedia units through its transmission system. In order to do this, the operator has to know the secret data which allows the personalization of the multimedia units in the same way as the manufacturer of multimedia units in the previous case. In this case, the supplier has to deliver to the operator a huge quantity of data, as they used to with the manufacturer of the multimedia units.

There is thus a need for a solution for reducing the quantity of data to be transmitted during the personalization of the receiving devices, it would be advantageous to be able to produce these receiving devices without secret data of an operator.

3. SUMMARY

A particular aspect of the present disclosure relates to a method for pairing a content provider system and a receiving device intended to receive content data from the content provider system through a first communications network. An authority server is communicatively connected to the receiving device and to the content provider system through a second communications network. A cryptographic function and a receiving device unique identifier are populated in the receiving device. According to such method, the receiving device executes:

obtaining a first key which is a result of a first function implementing a user secret key generation, the first function taking as arguments, on one hand, an Identity Based Encryption scheme master key owned by the authority server and, on the other hand, an output of the cryptographic function applied to the receiving device unique identifier;

receiving, from the content provider system, a content provider unique identifier; and computing a secret key which is a result of a second function taking as operands, on one hand, the first key and, on the other hand, an output of the cryptographic function applied to the content provider unique identifier, the secret key being known from the content provider system.

Thus, the present disclosure proposes a new and inventive solution for reducing the quantity of data to be transmitted during the personalization of a receiving device (e.g. a multimedia unit such as a smart-TV, a smartphone, a tablet, etc.) to be paired with a content provider system (e.g. belonging to an operator such as a pay-tv operator).

More particularly, the proposed solution relies on the simple exchange of identifiers between the receiving device and the content provider system to be paired with for allowing the generation of a secret key known only by the receiving device and the content provider system. This allows avoiding the delivery of huge key packages by the key authority (e.g. in the meaning of the identity-based encryption (IBE) standard) to both the manufacturer of the receiving device and the entity managing the content provider system. Furthermore, with the proposed scheme, there is no need for the entity managing the content provider system to provide a secret data to the receiving devices, the same content provider identifier being provided to the different receiving devices to be paired with it.

In some embodiments, the second function taking as operands:
  on one hand, the first key; and
  on the other hand, an output of the cryptographic function applied to the content provider unique identifier,
  delivers a same result as the second function taking as operands:
  on one hand, a second key which is a result of the first function taking as arguments, on one hand, the master key and, on the other hand, an output of the cryptographic function applied to the content provider unique identifier; and
  on the other hand, an output of the cryptographic function applied to the receiving device unique identifier.

Thus, thanks to the properties of the first function (e.g. elliptic curve scalar point multiplication) in view of the second function (e.g. a bilinear pairing), a same secret key can be computed by both the content provider system and by the receiving device based on the simple exchange of identifiers between the receiving device and the content provider system to be paired with.

In some embodiments, the obtaining a first key comprises receiving the first key from the authority server.

Thus, the computing load is reduced for the receiving device.

In some embodiments, a public key known by the authority server is populated in the receiving device. The obtaining a first key comprises:
  generating a random number;
  encrypting the random number using the authority server public key;
  sending, to the authority server, the encrypted random number;
  receiving, from the authority server, a partial key corresponding to a result of a third function taking as an argument:
    a difference between the first key and a value which is a result of a predefined function of the random number and of the receiving device unique identifier; and
    the output of the cryptographic function applied to the receiving device unique identifier.

The structure of the third function and of the predefined function is known from the receiving device.

Thus, the type of data delivered by the key authority during the manufacturing of the receiving device is further reduced as only generic parameters have to be populated in the receiving device (i.e. the cryptographic function, the public key and the receiving device unique identifier). It's only on demand, when the receiving device effectively needs to be paired (e.g. in an on-field application) that the partial key is provided to the receiving device for allowing the receiving device to compute its first key, i.e. its own secret key.

For instance, the predefined function is e.g. a key derivation function or a hash function.

In some embodiments, the third function implements the elliptic curve scalar point multiplication between said difference and the output of the cryptographic function applied to the receiving device unique identifier.

According to another aspect of the present disclosure, a cryptographic function and a content provider unique identifier being populated in the content provider system, the content provider system executes:
  receiving, from the authority server, the second key which is a result of the first function taking as arguments, on one hand, the master key and, on the other hand, an output of the cryptographic function applied to the content provider unique identifier;
  receiving, from the receiving device, the receiving device unique identifier; and
  computing the secret key which is a result of the second function taking as operands, on one hand, the second key and, on the other hand, the output of the cryptographic function applied to the receiving device unique identifier, the secret key being known from the receiving device.

In some embodiments, the content provider system executes, before executing the receiving from the authority server the second key: sending, to the authority server, the content provider unique identifier.

In some embodiments, the first function implements the elliptic curve scalar point multiplication between said arguments, the output of the cryptographic function being a point on the elliptic curve.

In some embodiments, the second function implements the bilinear pairing between the operands.

In some embodiments, the cryptographic function is a hash function.

In some embodiments, the first communications network is a bidirectional communications network. For instance, the first communications network implements an internet protocol.

In some embodiments, the first communications network and the second communications network are a same network.

In some embodiments, the receiving the receiving device unique identifier or the content provider unique identifier comprises receiving the receiving device unique identifier or the content provider unique identifier through a secured communication channel.

Another aspect of the present disclosure relates to a computer program product comprising program code instructions for implementing the above-mentioned method for pairing a content provider system and a receiving device (in any of the different embodiments discussed above), when the program is executed on a computer or a processor.

Another aspect of the present disclosure relates to an electronic device configured for implementing all or part of the steps of the above-mentioned method for pairing a content provider system and a receiving device as executed by said receiving device (in any of the different embodiments discussed above). Thus, the features and advantages of this device are the same as those of the corresponding steps of said method. Therefore, they are not detailed any further.

Another aspect of the present disclosure relates to an electronic device configured for implementing all or part of the steps of the above-mentioned method for pairing a content provider system and a receiving device as executed by said content provider system (in any of the different embodiments discussed above). Thus, the features and advantages of this device are the same as those of the corresponding steps of said method. Therefore, they are not detailed any further.

4. LIST OF FIGURES

Other features and advantages of embodiments shall appear from the following description, given by way of indicative and non-exhaustive examples and from the appended drawings, of which:

FIG. 1 illustrates a receiving device in communication with a content provider system and with an authority server according to one embodiment of the present disclosure;

FIG. 3 illustrates an example of the structural blocks of a device allowing all or part of the corresponding steps of the method of FIGS. 2, 2a and 2b to be executed by the authority server of FIG. 1;

FIG. 4 illustrates an example of the structural blocks of a device allowing all or part of the corresponding steps of the method of FIGS. 2, 2a and 2b to be executed by the receiving device of FIG. 1;

FIG. 5 illustrates an example of the structural blocks of a device allowing all or part of the corresponding steps of the method of FIGS. 2, 2a and 2b to be executed by the content provider system of FIG. 1.

5. DETAILED DESCRIPTION

Figure 2:
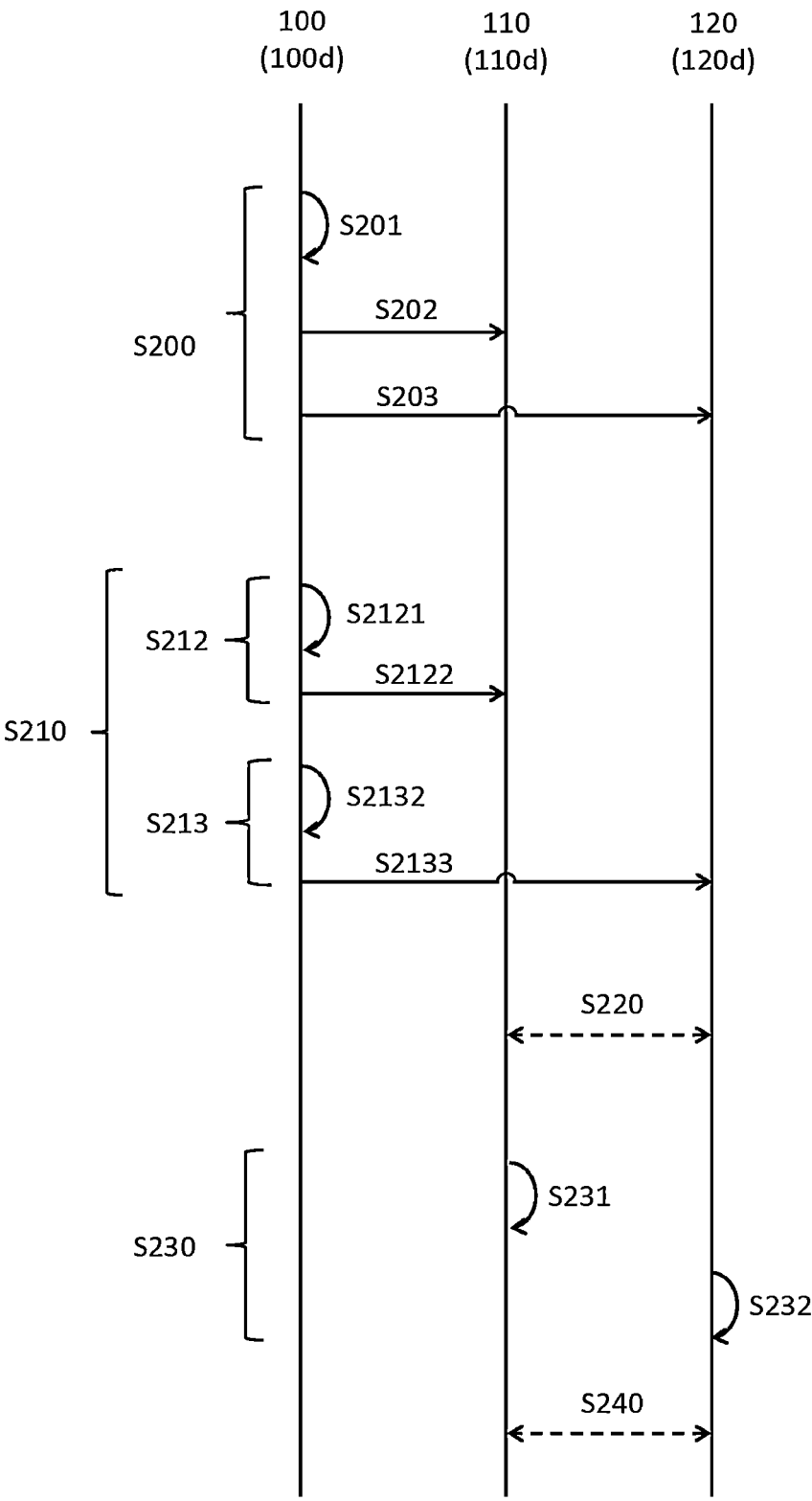
FIG. 2 illustrates the steps of a method for pairing the content provider system and the receiving device of FIG. 1 according to one embodiment of the present disclosure.

In all of the Figures of the present document, the same numerical reference signs designate similar elements and steps.

Referring now to FIG. 1, we describe a receiving device 110 in communication with a content provider system 120 and with an authority server 100 according to one embodiment of the present disclosure.

In the present embodiment, the receiving device 110 takes the form of a smart-TV. However, in other embodiments, the receiving device 110 is another type of multimedia receiving device, e.g. a smart-TV, a smartphone, a tablet, etc.

Back to FIG. 1, the receiving device 110 receives content data (e.g. a multimedia content) from the content provider system 120 through a first communications 150 network. In the present embodiment, the first communications 150 network is a cellular network comprising a base station 150bs, e.g. a 3rd Generation Partnership Project (3GPP) 3G, 4G, 5G, etc. network. Such cellular network is a bi-directional network allowing the receiving device 110 and the content provider system 120 to exchange their respective unique identifier as detailed below in relation with FIGS. 2, 2a and 2b. However, in other embodiments, the first communications 150 network is another type of bi-directional network, e.g. a wired network. It can be e.g. a communications network implementing an internet protocol. However, it does not prevent having the receiving device 110 and the content provider system 120 to be also connected through another communications network, e.g. a broadcast (or uni-directional) network for having the content provider system 120 to send the content data itself to the receiving device 110.

Back to FIG. 1, the content data is e.g. a conditional-access content that requires the receiving device 110 and the content provider system 120 to be paired, e.g. through the population of cryptographic means (algorithms, keys) specific to the content provider in the receiving device 110. For this to be possible, the authority server 100 (e.g. in the meaning of the identity-based encryption (IBE) standard) is communicatively connected to the receiving device 110 and to the content provider system 120 through a second communications 160 network for providing all or part of those cryptographic means. More particularly, the second communications 160 network is e.g. a bi-directional network allowing the authority server 100, the receiving device 110 and the content provider system 120 to exchange data as detailed below in relation with FIGS. 2, 2a and 2b. It can be e.g. a communications network implementing an internet protocol. However, in some embodiments, the first communications 150 network and the second communications 160 network are a same network.

Back to FIG. 1, the authority server 100 comprises a device 100d implementing means configured for executing all or part of the corresponding steps of the method for pairing discussed below in relation with FIGS. 2, 2a and 2b. The means implemented in the device 100d are further discussed below in relation with FIG. 3.

The receiving device 110 comprises a device 110d implementing means configured for executing all or part of the corresponding steps of the method for pairing discussed below in relation with FIGS. 2, 2a and 2b. The means implemented in the device 110d are further discussed below in relation with FIG. 4.

The content provider system 120 comprises a device 120d implementing means configured for executing all or part of the corresponding steps of the method for pairing discussed below in relation with FIGS. 2, 2a and 2b. The means implemented in the device 120d are further discussed below in relation with FIG. 4.

Referring now to FIG. 2, we describe a method for pairing the content provider system 120 and the receiving device 110 according to one embodiment of the present disclosure.

In a step S200, an initial set-up is performed. More particularly, the step S200 comprises:

a step S201 wherein an IBE scheme master key $N^G$ owned by the authority server 100 is generated and populated in the authority server 100;

a step S202 wherein a cryptographic function $H_{custom}$ (e.g. a hash function) and a receiving device unique identifier $ID_{device}$ are provided by the authority server 100 and populated in the receiving device 110. For instance, such populating is performed during the manufacturing phase of the receiving device 110, e.g. according to the mechanism discussed above in the "Technological background" section. Alternatively, such populating is performed through the sending of the respective data, e.g. through a secure channel established through the second communications 160 network. In yet other implementations, the device unique identifier $ID_{device}$ is provided and populated in the receiving device 110 by the manufacturer of the receiving device 110. The device unique identifier $ID_{device}$ is then provided by the manufacturer of the receiving device 110 (e.g. sent through a secure channel established through the second communications 160 network) to the authority server 100 once the receiving device 110 is produced; and a step S203 wherein the cryptographic function $H_{custom}$ provided by the authority server 100 is populated in the content provider system 120, e.g. through the providing of the cryptographic function $H_{custom}$ to the content provider. In the same way, a content provider unique identifier $ID_{operator}$ is populated in the content provider system 120. In the present embodiment, the content provider unique identifier $ID_{operator}$ is provided by the authority server 100 to the content provider as is the cryptographic function $H_{custom}$. However, such content provider unique identifier $ID_{operator}$ is not necessarily provided by the authority server 100. In some embodiments, the content provider unique identifier $ID_{operator}$ is generated by the content provider itself and populated as such in the content provider system 120.

Back to FIG. 2, in a step S210, an assets provisioning is performed. More particularly the step S210 comprises:

a step S212 wherein the receiving device 110 obtains a first key $$KU_j^u$$

which is a result of a first function implementing a user secret key generation. The first function takes as arguments, on one hand, the IBE scheme master key $N^G$ and, on the other hand, an output $$U_j^u$$

of the cryptographic function $H_{custom}$ applied to the receiving device unique identifier $ID_{device}$, i.e.

$$U_j^u = H_{custom}(ID_{device});$$

and a step S213 wherein the content provider system 120 obtains a second key $$KO_i^u$$

which is a result of the first function when taking as arguments, on one hand, the IBE scheme master key $N^G$ and, on the other hand, an output $$O_i^u$$

of the cryptographic function $H_{custom}$ applied to the content provider unique identifier $ID_{operator}$, i.e.

$$O_i^u = H_{custom}(ID_{operator}).$$

According to the present embodiment, the step S212 comprises a step S2121 wherein the authority server 100 computes the first key $$KU_j^u.$$

The step S212 further comprises a step S2122 wherein the authority server 100 sends the first key $$KU_j^u$$

to the receiving device 110. Conversely, during step S2122 the receiving device 110 receives the first key $$KU_j^u$$

sent by the authority server 100. Thus, the computing load is reduced for the receiving device 110.

In the same way, according to the present embodiment, the step S213 comprises a step S2132 wherein the authority server 100 computes the second key $$KO_i^u$$

The step S213 further comprises a step S2133 wherein the authority server 100 sends the second key $$KO_i^u$$

to the content provider system 120. Conversely, during step S2133 the content provider system 120 receives the second key $$KO_i^u$$

sent by the authority server 100.

In a step S220, a binding of the receiving device 110 to the content provider system 120 is performed. More particularly, during step S220, the content provider system 120 sends, to the receiving device 110, the content provider unique identifier $ID_{operator}$. Conversely, during step S220 the receiving device 110 receives, from the content provider system 120, the content provider unique identifier $ID_{operator}$. In the same way, during step S220, the receiving device 110 sends, to the content provider system 120, the receiving device unique identifier $ID_{device}$. Conversely, during step S220 the content provider system 120 receives, from the receiving device 110, the receiving device unique identifier $ID_{device}$. For instance, the device unique identifier $ID_{device}$ and the content provider unique identifier $ID_{operator}$ are sent, resp. received, through a secured communication channel established e.g. through the first communications 150 network or through the second communications 160 network.

In a step S230, a secret key K $$K_{ij}^u$$

shared between the receiving device 110 and the content provider system 120 is computed. More particularly, the step S230 comprises:

a step S231 wherein the receiving device 110 computes the secret key $$K_{ij}^u$$

as the result of a second function taking as operands, on one hand, the first key $$KU_j^u$$

and, on the other hand, the output $$O_i^u$$

of the cryptographic function $H_{custom}$ applied to the content provider unique identifier $ID_{operator}$, i.e $$O_i^u = H_{custom}(ID_{operator}); \text{ and}$$

a step S232 wherein the content provider system 120 computes the secret key $$K_{ij}^u$$

as the result of the second function taking as operands, on one hand, the second key $$KO_i^u$$

and, on the other hand, the output $$U_j^u$$

of the cryptographic function $H_{custom}$ applied to the receiving device unique identifier $ID_{device}$, i.e. $U_j^u = H_{custom}(ID_{device})$.

More particularly, the first function and the second function are such that when the second function takes as operands, on one hand, the first key $$KU_j^u$$

and, on the other hand, $$O_i^u = H_{custom}(ID_{operator}),$$

we obtain the same result as when the second function takes as operands, on one hand, the second key $$KO_i^u$$

and, on the other hand, $$U_j^u = H_{custom}(ID_{device}).$$

Thus, the same secret key $$K_{ij}^u$$

is computed independently by the receiving device 110 and the content provider system 120. This allows the generation of a same secret key $$K_{ij}^u$$

known only by the receiving device 110 and the content provider system 120. The proposed solution thus relies on the simple exchange of identifiers $ID_{device}$, $ID_{operator}$ between the receiving device 110 and the content provider system 120 to be paired with. This allows avoiding the delivery of huge key packages by the key authority (e.g. in the meaning of the IBE standard) to both the manufacturer of the receiving device 110 and the entity managing the content provider system 120. Furthermore, with the proposed scheme, there is no need for the entity managing the content provider system 120 to provide a secret data to the receiving devices 110, the same content provider unique identifier $ID_{operator}$ being provided to the different receiving devices 110 to be paired with it.

Among the different IBE based functions that can be considered for implementing the first function and the second function with the above-mentioned properties, we can consider for instance:

a first function that implements the elliptic curve scalar point multiplication between the arguments, the output of the cryptographic function $H_{custom}$ being a point on the elliptic curve; and a second function that implements the bilinear pairing between the operands.

According to such example, during the step S231 the receiving device 110 computes the secret key $$K_{ij}^u$$

as:

$$K_{ij}^u = e\big(KU_j^u, H_{custom}(ID_{operator})\big) =$$

$$e\big(N^G \cdot U_j^u, H_{custom}(ID_{operator})\big) = e\big(N^G \cdot H_{custom}(ID_{device}), H_{custom}(ID_{operator})\big)$$

with $N^G$.

$$U_j^u$$

that denotes the elliptic curve scalar point multiplication between $N^G$ and $$U_j^u,$$

and e(.,.) that denotes the bilinear pairing between operands.

In the same way, during the step S232, the content provider system 120 computes the secret key $$K_{ij}^u$$

as:

$$K_{ij}^u = e\big(KO_i^u, H_{custom}(ID_{device})\big) =$$

$$e\big(N^G \cdot O_i^u, H_{custom}(ID_{device})\big) = e\big(N^G \cdot H_{custom}(ID_{operator}), H_{custom}(ID_{device})\big)$$

with $N^G$.

$$O_i^u$$

that denotes the elliptic curve scalar point multiplication between $N^G$ and $$O_i^u,$$

and e(.,.) that denotes the bilinear pairing between operands.

Due to the properties of the elliptic curve scalar point multiplication in view of the bilinear pairing that match the above-mentioned properties for the first function and the second function, we get:

$$e\big(N^G \cdot H_{custom}(ID_{device}), H_{custom}(ID_{operator})\big) =$$

$$e\big(N^G \cdot H_{custom}(ID_{operator}), H_{custom}(ID_{device})\big)$$

Thus, the same secret key $$K_{ij}^u$$

is computed by the receiving device 110 and by the content provider system 120. However, the same result can be achieved considering different IBE based functions that can be considered for implementing the first function and the second function with the above-mentioned properties.

Figures 2A, 2B:
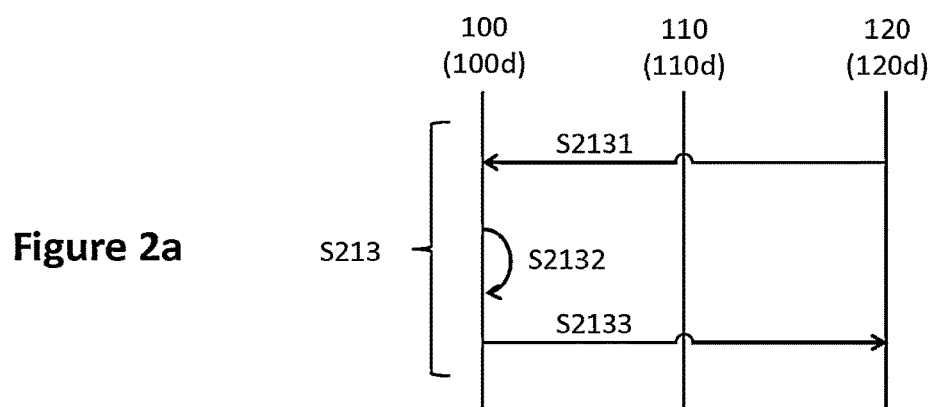
FIG. 2a illustrates the step of obtaining a second key of the method for pairing the content provider system and the receiving device of FIG. 1 according to one embodiment of the present disclosure.
FIG. 2b illustrates the step of initial set-up and the step of obtaining a first key of the method for pairing the content provider system and the receiving device of FIG. 1 according to one embodiment of the present disclosure.

Referring now to FIG. 2*a*, we describe an alternative embodiment for the step S213 of the method for pairing the content provider system 120 and the receiving device 110. The step S213 according to the present embodiment can be combined with the other steps of the method for pairing the content provider system 120 and the receiving device 110 described above in relation with FIG. 2 (in any of the embodiments described above in relation with FIG. 2).

More particularly, in the present embodiment, the step S213 comprises the same steps S2132 and S2133 as described above in relation with FIG. 2 (in any of the embodiments described above in relation with FIG. 2). However, before the execution of the steps S2132 and S2133, during a step S2131 the content provider system 120 sends, to the authority server 100, the content provider unique identifier $ID_{operator}$. Conversely, during step S2131, the authority server 100 receives, from the content provider system 120 the content provider unique identifier $ID_{operator}$.

Such embodiment can be of interest in case the content provider unique identifier $ID_{operator}$ was not provided by the authority server 100 during the step S203 described above in relation with FIG. 2. Indeed, in such case the authority server 100 does not have the knowledge of the content provider unique identifier $ID_{operator}$, e.g. when such content provider unique identifier $ID_{operator}$ has been generated by the content provider itself. Thus, following the execution of the step S2131, the authority server 100 has the knowledge of the content provider unique identifier $ID_{operator}$ and can thus execute the steps S2132 and 2133.

Referring now to FIG. 2*b*, we describe an alternative embodiment for the step S200 and for the step S212 of the method for pairing the content provider system 120 and the receiving device 110. The step S200 and the step S212 according to the present embodiment can be combined with the other steps of the method for pairing the content provider system 120 and the receiving device 110 described above in relation with FIGS. 2 and 2*a* (in any of the embodiments described above in relation with FIGS. 2 and 2*a*).

More particularly, in the present embodiment, the step S200 comprises the same steps S201, S202 and S203 as described above in relation with FIG. 2 (in any of the embodiments described above in relation with FIG. 2). However, in the present embodiment, the step S200 further comprises a step S204 wherein a public key $NPub^G$ owned by the authority server 100 is generated and populated in the authority server 100. Conversely, the private key corresponding to the public key $NPub^G$ is generated and kept secret in the authority server 100.

In a step S205 The public key $NPub^G$ provided by the authority server 100 is populated in the receiving device 110. For instance, such populating is performed during the manufacturing phase of the receiving device 110, e.g. according to the mechanism discussed above in the "Technological background" section. Alternatively, such populating is performed through the sending of the respective data, e.g.

---

13 through a secure channel established e.g. through the second communications 160 network.

Back to FIG. 2b, according to the present embodiment, the step S212 comprises:

a step S2123 wherein the receiving device 110 generates a random number $r_j$;

a step S2124 wherein the receiving device 110 encrypts the random number $r_j$ using the authority server public key NPub$^G$;

a step S2125 wherein the receiving device 110 sends, to the authority server 100, the encrypted random number $(r_j)_{NPub}{}^G$. Conversely, during step S2124, the authority server 100 receives, from the receiving device 110, the encrypted random number $(r_j)_{NPub}{}^G$. The encrypted random number $(r_j)_{NPub}{}^G$ can be further decrypted by the authority server 100, using e.g. the private key corresponding to the public key NPub$^G$, for recovering the random number $r_j$;

a step S2126 wherein the authority server 100 computes a partial key $\widetilde{KU}_j^u\cdot$ corresponding to a result of a third function taking as an argument:

a difference between the first key $$KU_j^u$$

and a value which is a result of a predefined function KDF of the random number $r_j$ and of the receiving device unique identifier $ID_{device}$; and the output $$U_j^u$$

of the cryptographic function $H_{custom}$ applied to the receiving device unique identifier $ID_{device}$, i.e.

$$U_j^u = H_{custom}(ID_{device}).$$

a step S2127 wherein the receiving device 110 receives, from the authority server 100, the partial key $\widetilde{KU}_j^u\cdot$.

More particularly, the structure of the third function and of the predefined function KDF are known from the receiving device 110 for allowing the receiving device 110 to compute its first key KU from the received partial key $\widetilde{KU}_j^u\cdot$.

Thus, the type of data delivered by the key authority during the manufacturing of the receiving device 110 is further reduced as only generic parameters have to be populated in the receiving device 110 (i.e. the cryptographic function $H_{custom}$, the public key NPub$^G$ and the receiving device unique identifier $ID_{device}$). It's only on demand, when the receiving device 110 effectively needs to be paired (e.g. in an on-field application) that the partial key $\widetilde{KU}_j^u\cdot$ is provided to the receiving device 110 for allowing the receiving device 110 to compute its first key $$KU_j^u.$$

14

In some embodiments, the predefined function KDF is e.g. a key derivation function or a hash function.

In some embodiments, the third function implements the elliptic curve scalar point multiplication between:

the difference between the first key $$KU_j^u$$

and a value which is a result of a predefined function KDF of the random number $r_j$ and of the receiving device unique identifier $ID_{device}$; and the output $$U_j^u$$

of the cryptographic function $H_{custom}$ applied to the receiving device unique identifier $ID_{device}$.

In those embodiments, we thus get $$\widetilde{KU}_j^u = (N^G - KDF(r_j, ID_{device})).$$

$$U_j^u.$$

The receiving device 110 thus can compute its first key $$KU_j^u \text{ as } KU_j^u$$

$$=KDF(r_j, ID_{device})\cdot$$

$$U_j^u + \widetilde{KU}_j^u,$$

the predefined function KDF being known from the receiving device 110. The first key $$KU_j^u$$

is thus never computed, transmitted or exposed out of the receiving device 110.

Referring now to FIG. 3, we describe an example of the structural blocks implemented in the device 100d.

More particularly, in order to be able to implement all or part of the steps of the method for pairing the content provider system 120 and the receiving device 110 discussed above in relation with FIGS. 2, 2a and 2b as executed by the authority server 100 (according to any of the embodiments disclosed above), in some embodiments the device 100d comprises:

a non-volatile memory 303 (e.g. a read-only memory (ROM), a hard disk, a flash memory, etc.);

a volatile memory 301 (e.g. a random-access memory or RAM) and a processor 302.

The non-volatile memory 303 is a non-transitory computer-readable carrier medium. It stores executable program code instructions, which are executed by the processor 302 in order to enable implementation of some steps of the method described above (method for pairing the content provider system 120 and the receiving device 110) in the various embodiments disclosed above in relationship with FIGS. 2, 2a and 2b.

Upon initialization, the aforementioned program code instructions are transferred from the non-volatile memory 303 to the volatile memory 301 so as to be executed by the processor 302. The volatile memory 301 likewise includes registers for storing the variables and parameters required for this execution.

The steps of the method for pairing the content provider system 120 and the receiving device 110 as executed by the authority server 100 may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

Referring now to FIG. 4, we describe an example of the structural blocks implemented in the device 110d.

More particularly, in order to be able to implement all or part of the steps of the method for pairing the content provider system 120 and the receiving device 110 discussed above in relation with FIGS. 2, 2a and 2b as executed by the receiving device 110 (according to any of the embodiments disclosed above), in some embodiments the device 110d comprises:

a non-volatile memory 403 (e.g. a read-only memory (ROM), a hard disk, a flash memory, etc.);

a volatile memory 401 (e.g. a random-access memory or RAM) and a processor 402.

The non-volatile memory 403 is a non-transitory computer-readable carrier medium. It stores executable program code instructions, which are executed by the processor 402 in order to enable implementation of some steps of the method described above (method for pairing the content provider system 120 and the receiving device 110) in the various embodiments disclosed above in relationship with FIGS. 2, 2a and 2b.

Upon initialization, the aforementioned program code instructions are transferred from the non-volatile memory 403 to the volatile memory 401 so as to be executed by the processor 402. The volatile memory 401 likewise includes registers for storing the variables and parameters required for this execution.

The steps of the method for pairing the content provider system 120 and the receiving device 110 as executed by the receiving device 110 may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

Referring now to FIG. 5, we describe an example of the structural blocks implemented in the device 120d.

More particularly, in order to be able to implement all or part of the steps of the method for pairing the content provider system 120 and the receiving device 110 discussed above in relation with FIGS. 2, 2a and 2b as executed by the content provider system 120 (according to any of the embodiments disclosed above), in some embodiments the device 120d comprises:

a non-volatile memory 503 (e.g. a read-only memory (ROM), a hard disk, a flash memory, etc.);

a volatile memory 501 (e.g. a random-access memory or RAM) and a processor 502.

The non-volatile memory 503 is a non-transitory computer-readable carrier medium. It stores executable program code instructions, which are executed by the processor 502 in order to enable implementation of some steps of the method described above (method for pairing the content provider system 120 and the receiving device 110) in the various embodiments disclosed above in relationship with FIGS. 2, 2a and 2b.

Upon initialization, the aforementioned program code instructions are transferred from the non-volatile memory 503 to the volatile memory 501 so as to be executed by the processor 502. The volatile memory 501 likewise includes registers for storing the variables and parameters required for this execution.

The steps of the method for pairing the content provider system 120 and the receiving device 110 as executed by the content provider system 120 may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

The invention claimed is:

1. A method for pairing a content provider system and a receiving device intended to receive content data from said content provider system through a first communications network, an authority server being communicatively connected to the receiving device and to the content provider system through a second communications network, a cryptographic function and a receiving device unique identifier being populated in the receiving device, comprising, by processing circuitry of the receiving device:

obtaining a first key which is a result of a first function implementing a user secret key generation, the first function taking as arguments, an Identity Based Encryption scheme master key owned by the authority server and an output of the cryptographic function applied to the receiving device unique identifier;

receiving, from the content provider system, a content provider unique identifier;

computing a secret key which is a result of a second function taking as operands, the first key and an output of the cryptographic function applied to the content provider unique identifier, the secret key being known by the content provider system; and pairing the content provider system and the receiving device based on the secret key being known by the content provider system.

2. The method according to claim 1, wherein the second function taking as operands:

the first key, and an output of the cryptographic function applied to the content provider unique identifier, delivers a same result as the second function taking as operands:

a second key which is a result of the first function taking as arguments, the master key and, an output of the cryptographic function applied to the content provider unique identifier, and an output of the cryptographic function applied to the receiving device unique identifier.

3. The method according to claim 1, wherein said obtaining a first key further comprises receiving the first key from the authority server.

4. The method according to claim 1, wherein a public key known by the authority server is populated in the receiving device, wherein said obtaining a first key further comprises:

generating a random number;

encrypting the random number using the authority server public key;

sending, to the authority server, the encrypted random number;

receiving, from the authority server, a partial key corresponding to a result of a third function taking as an argument:

a difference between the first key and a value which is a result of a predefined function of said random number and of said receiving device unique identifier, and said output of the cryptographic function applied to the receiving device unique identifier, and wherein a structure of said third function and of said predefined function is known from the receiving device.

5. A method for pairing a content provider system and a receiving device intended to receive content data from said content provider system through a first communications network, an authority server being communicatively connected to the receiving device and to the content provider system through a second communications network, a cryptographic function and a content provider unique identifier being populated in the content provider system, comprising, by processing circuitry of the content provider system:

receiving, from the authority server, a second key which is a result of a first function implementing a user secret key generation, the first function taking as arguments, an Identity Based Encryption scheme master key owned by the authority server and an output of the cryptographic function applied to the content provider unique identifier;

receiving, from the receiving device, a receiving device unique identifier;

computing a secret key which is a result of a second function taking as operands, the second key and an output of the cryptographic function applied to the receiving device unique identifier, the secret key being known by the receiving device; and pairing the content provider system and the receiving device based on the secret key being known by the content provider system.

6. The method according to claim 5, wherein the second function taking as operands:

the second key, and an output of the cryptographic function applied to the receiving device unique identifier, delivers a same result as the second function taking as operands:

a first key which is a result of the first function taking as arguments, the master key and, an output of the cryptographic function applied to the receiving device unique identifier, and an output of the cryptographic function applied to the content provider unique identifier.

7. The method according to claim 5, further comprising, before executing said receiving from the authority server the second key by the content provider system:

sending, to the authority server, the content provider unique identifier.

8. The method according to claim 1, wherein said first function implements elliptic curve scalar point multiplication between said arguments, said output of said cryptographic function being a point on an elliptic curve.

9. The method according to claim 1, wherein said second function implements bilinear pairing between said operands.

10. The method according to claim 1, wherein said first communications network is a bidirectional communications network.

11. The method according to claim 1, wherein said first communications network and said second communications network are a same network.

12. The method according to claim 1, wherein said receiving the receiving device unique identifier or the content provider unique identifier further comprises receiving the receiving device unique identifier or the content provider unique identifier through a secured communication channel.

13. A non-transitory computer readable medium having stored thereon program code instructions for implementing the method according to claim 1.

14. An electronic device for pairing a content provider system and a receiving device intended to receive content data from said content provider system through a first communications network, an authority server being communicatively connected to the receiving device and to the content provider system through a second communications network, a cryptographic function and a receiving device unique identifier being populated in the electronic device, the electronic device comprising:

processing circuitry or a dedicated computing machine configured to, when the electronic device is implemented in the receiving device:

obtain a first key which is a result of a first function implementing a user secret key generation, the first function taking as arguments, an Identity Based Encryption scheme master key owned by the authority server and an output of the cryptographic function applied to the receiving device unique identifier;

obtain, from the content provider system, a content provider unique identifier;

compute a secret key which is a result of a second function taking as operands, the first key and an output of the cryptographic function applied to the content provider unique identifier, the secret key being known by the content provider system; and pair the content provider system and the receiving device based on the secret key being known by the content provider system.

15. An electronic device for pairing a content provider system and a receiving device intended to receive content data from said content provider system through a first communications network, an authority server being communicatively connected to the receiving device and to the content provider system through a second communications network, a cryptographic function and a content provider unique identifier being populated in the electronic device, the electronic device comprising:

processing circuitry or a dedicated computing machine configured to, when the electronic device is implemented in the content provider system:

receive, from the authority server, a second key which is a result of a first function implementing a user secret key generation, the first function taking as arguments, an Identity Based Encryption scheme master key owned by the authority server and an output of the cryptographic function applied to the content provider unique identifier;

receive, from the receiving device, a receiving device unique identifier; and compute a secret key which is a result of a second function taking as operands, the second key and an output of the cryptographic function applied to the receiving device unique identifier, the secret key being known by the receiving device; and pair the content provider system and the receiving device based on the secret key being known by the content provider system.

16. The method according to claim 2, wherein said obtaining a first key further comprises receiving the first key from the authority server.

17. The method according to claim 2, wherein a public key known by the authority server is populated in the receiving device, wherein said obtaining a first key further comprises:

generating a random number;

encrypting the random number using the authority server public key;

sending, to the authority server, the encrypted random number;

receiving, from the authority server, a partial key corresponding to a result of a third function taking as an argument:

a difference between the first key and a value which is a result of a predefined function of said random number and of said receiving device unique identifier, and said output of the cryptographic function applied to the receiving device unique identifier, and wherein a structure of said third function and of said predefined function is known from the receiving device.

18. The method according to claim 6, further comprising, before executing said receiving from the authority server the second key by the content provider system:

sending, to the authority server, the content provider unique identifier.

19. The method according to claim 5, wherein said first function implements elliptic curve scalar point multiplication between said arguments, said output of said cryptographic function being a point on an elliptic curve.

* * * * *